United States Patent
Warren

(10) Patent No.: US 6,321,503 B1
(45) Date of Patent: Nov. 27, 2001

(54) FOLDABLE MEMBER

(75) Inventor: Peter A. Warren, Newton, MA (US)

(73) Assignee: Foster Miller, Inc., Waltham, MA (US)

( * ) Notice: Subject to any disclaimer, the term of this patent is extended or adjusted under 35 U.S.C. 154(b) by 0 days.

(21) Appl. No.: 09/441,252

(22) Filed: Nov. 16, 1999

(51) Int. Cl.$^7$ ..................................................... E04C 2/38
(52) U.S. Cl. ............................. 52/658; 52/646; 52/648.1; 52/653.2; 52/656.1; 403/309; 403/310; 403/169; 403/313; 16/225; 16/DIG. 13
(58) Field of Search ..................................... 403/313, 310, 403/309, 169; 16/225, DIG. 13; 52/646, 648.1, 653.2, 656.1, 658

(56) References Cited

U.S. PATENT DOCUMENTS

| | | |
|---|---|---|
| 187,078 | 2/1877 | Adams . |
| 940,399 | 11/1909 | Mueser . |
| 1,026,801 | 5/1912 | Haase . |
| 2,461,916 | 2/1949 | Omar . |
| 3,035,708 | 5/1962 | Freeman . |
| 3,326,497 | 6/1967 | Michelson . |
| 3,459,391 | 8/1969 | Haynos . |
| 3,460,992 | 8/1969 | Avilov et al. . |
| 3,473,758 | 10/1969 | Webb . |
| 3,477,662 | 11/1969 | Anderson . |
| 3,612,287 | 10/1971 | Maltese . |
| 3,652,935 | 3/1972 | Shaw . |
| 3,757,476 | 9/1973 | Schoen . |
| 3,875,711 * | 4/1975 | Palmer .................................. 52/239 |
| 4,030,102 * | 6/1977 | Kaplan ................................. 343/915 |
| 4,137,686 | 2/1979 | Kern . |
| 4,145,765 | 3/1979 | Malone . |
| 4,250,679 | 2/1981 | Burg . |
| 4,259,821 | 4/1981 | Bush . |
| 4,334,391 | 6/1982 | Hedgepeth et al. . |
| 4,365,908 | 12/1982 | Thiboutot . |
| 4,417,427 | 11/1983 | Bschorr . |
| 4,453,353 | 6/1984 | Killop et al. . |
| 4,574,553 * | 3/1986 | Lisec ...................................... 52/658 |
| 4,579,302 | 4/1986 | Schneider et al. . |
| 4,603,521 * | 8/1986 | Engelhart .............................. 52/658 |
| 4,614,502 | 9/1986 | Nelson . |
| 4,655,022 | 4/1987 | Natori . |
| 4,686,134 | 8/1987 | Ono . |
| 4,778,184 | 10/1988 | Fleischer . |
| 5,228,644 | 7/1993 | Garriott et al. . |
| 5,366,012 * | 11/1994 | Lohbeck ............................... 166/277 |
| 5,390,463 | 2/1995 | Sollner . |
| 5,664,380 | 9/1997 | Hsueh . |
| 5,804,277 | 9/1998 | Ashbee . |
| 5,921,048 | 7/1999 | Francom et al. . |
| 5,924,745 * | 7/1999 | Campbell ............................... 285/90 |
| 5,977,932 | 11/1999 | Robinson . |
| 6,028,570 | 2/2000 | Gilger et al. . |
| 6,178,702 | 1/2001 | Hand et al. . |

OTHER PUBLICATIONS

Mikulas, Martin M. Jr., "Structural Efficiency of Long Lightly Loaded Truss and Isogrid Columns for Space Applications", National Aeronautics and Space Administration, Langley Research Center, Hampton, Virginia 23665, pp.: 1–27, Jul. 1978.

Jensen, David W., "A Glimpse Into the World of Innovative Composite IsoTruss™ Grid Structures", Sample J., vol. 36, No. 5 (Sep./Oct. 2000).

* cited by examiner

Primary Examiner—Beth A. Stephan
Assistant Examiner—Christy M. Syres
(74) Attorney, Agent, or Firm—Iandiorio & Teska

(57) ABSTRACT

A foldable member in the shape of a tube with at least one predetermined hinge area along the length of the tube, and a plurality of opposing elongated slots in the tube at the hinge area thereof forming separated longitudinal strips of tube material between the slots which fold when subjected to localized buckling forces. A collapsible structure constructed of such foldable members.

12 Claims, 8 Drawing Sheets

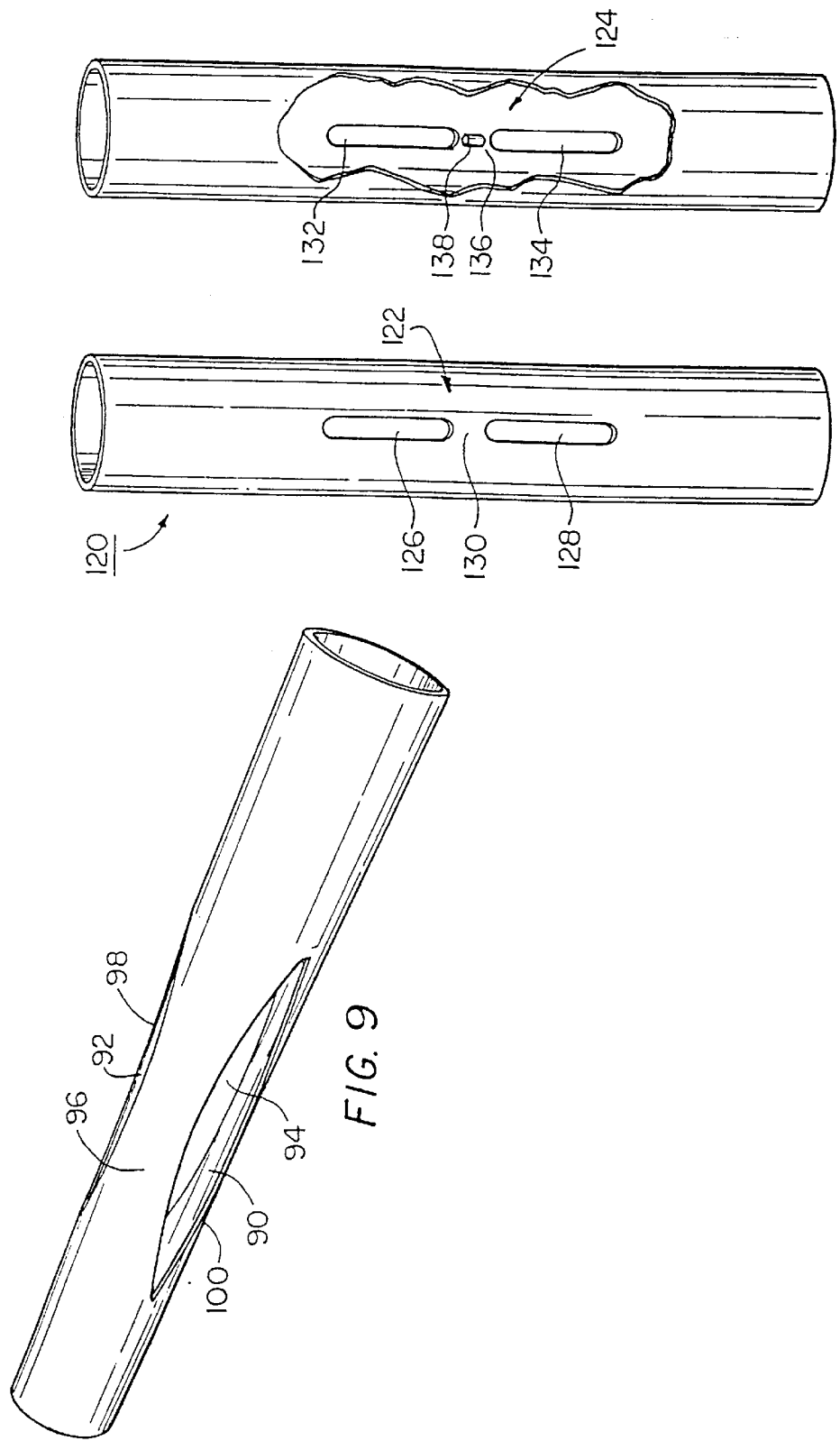

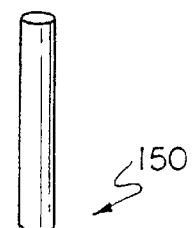
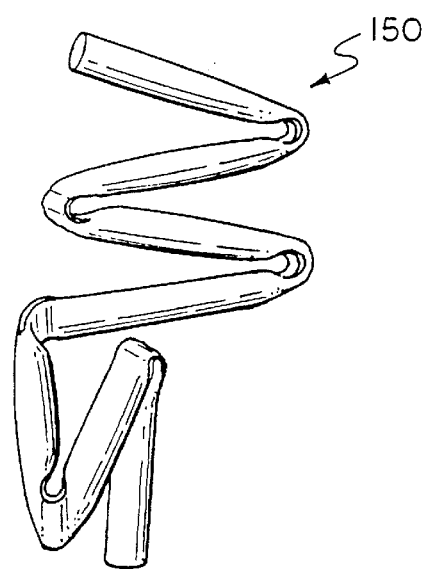
FIG. 13
FIG. 12

FOLDABLE MEMBER

GOVERNMENT RIGHTS

This invention was made with U.S. Government support under Contract No. F29601-98-CO-108 awarded by the U.S. Air Force. The Government may have certain rights in the subject invention.

RELATED PATENT APPLICATION

This application is a divisional application of a patent application entitled "Foldable Member" by the same inventor as the subject application filed on Nov. 9, 1999.

FIELD OF INVENTION

This invention relates to a foldable boom, truss, or longeron member, collapsible trusses and other similar structures made of such members.

BACKGROUND OF INVENTION

Key optical components of large aperture, space based optical instruments may be deployed on orbit to provide an aperture large enough to increase the resolution and optical performance by several orders of magnitude. The performance of such instruments depends on maintaining the precision and stability of the deployed structural geometry to within nanometers of an ideal shape. Nonlinear contact mechanics and freedom in the components of deployed structures mean that deployed instruments will have the capacity to change shape at the micron and nanometer level of resolution. Eliminating such nonlinearities as load path friction and freeplay would enable a deployed structure to be as linear and precise as a monolithic block of material.

In most mechanically deployed structures, components are moved from their stored positions into their final operational positions by some type of actuator and then locked into place with a deployment latch. For high precision structures, it is critical that the load paths and load predictable for the reliable operation of the instrument.

Existing deployable structure joints have several limitations that either completely prevent them from being used in high precision deployable instruments or require complex analysis and additional launch mass to provide deployment actuation and post deployment locking. Hinge joints previously used in moderate precision structures have relied on high levels of preload and friction to eliminate freeplay and geometric ambiguity. These joints have been shown to be unstable at the micron level, causing the structure to "microlurch" or change shape and thus move the instrument's optics far out of alignment.

Existing joints for precision space structures relied on high levels of preload between the many components to eliminate gaps and free play that cause inaccuracies in the structure. Unfortunately, these high levels of preload introduce correspondingly high levels of friction both during the deployment and after deployment has been completed. Friction mechanisms are nonlinear and thus are more difficult to control and less predictable.

Other hinge designs such as latch and actuator type systems suffer from the same disadvantages.

Recently, foldable truss members have been developed so that a truss structure can be collapsed and compactly packaged to save space during delivery and then released to expand and return to its original shape in orbit. All of these mechanisms add to the mass, expense and complexity of the structure and to the difficulty and expense of transporting it. These foldable members reduce the mass (and the delivery cost) of the structure by replacing the hinge, latch and actuator mechanisms with one single device. See, e.g., U.S. Pat. No. 4,334,391 incorporated herein by this reference.

Solid rods are joined on their ends forming a truss structure (a square frame for a solar panel array or a superstructure for a communications satellite antenna, for example) and pre-selected rods are cut in sections to form a hinge between the two sections. The rod sections are joined with spring steel elements similar to if not actually lengths of a carpenter's tape measure.

The rod sections can be folded with respect to each other by imparting a localized buckling force to one of the spring steel elements. Simply letting go of one rod section, returns the two rod sections to an end to end alignment due to the potential energy stored in the biased spring steel hinge elements.

In this way, a truss structure made up of several of these foldable rods can be designed on earth, collapsed for delivery to space, and then released once in position in space where the foldable rods flex back into position forming the truss structure designed and constructed on earth.

In use, this spring steel hinge design suffers from a number of shortcomings.

First, hinges formed of spring steel elements require joining the ends of each spring steel element to a rod section. These joints and the spring steel elements themselves add significantly to the overall weight of the truss structure which is an undesired factor in space launch capability.

The spring steel elements also result in dimensionally unstable truss structures. The dimensional instability is caused by the relative motion of the internal components including the joints between the spring elements and the rod sections and permanent yielding of different areas of the spring elements themselves.

The result is that the shape of the truss structure may change when it is erected in space from the shape of the truss structure before it was collapsed on earth. This can have disastrous effects on instrument performance as even a ten nanometer to ten micrometer displacement can severely affect the performance of primary and secondary optics attached to the truss structure.

SUMMARY OF INVENTION

It is therefore an object of this invention to provide a foldable member and a collapsible structure made of a number of foldable members that is lighter than prior art foldable members and collapsible structures.

It is a further object of this invention to provide such a member and such a structure which is more dimensionally stable.

It is a further object of this invention to provide such a foldable member which is a single piece design thereby eliminating numerous sources of imprecision.

It is a further object of this invention to provide such a member and such a structure which eliminates the need for deployment actuators and mechanical latches to further reduce system mass.

It is a further object of this invention to provide such a member and such a structure which have tailorable thermal expansion and conductivity properties and which thus can be designed for a multitude of performance requirements.

It is a further object of this invention to provide such a member which can be made of a variety of different types of materials.

It is a further object of this invention to provide such a member which is simple to manufacture and use.

It is a further object of this invention to provide a collapsible tube useful in variety of applications.

This invention results from the realization that a lighter and more dimensionally stable, foldable member can be constructed by cutting or forming longitudinal slots in a tube around the perimeter thereof at a location where the member is designed to bend thereby forming separated, longitudinal strips of tube material at that location which easily buckle allowing the member to fold without adding a separate hinge which would add weight to the member which would also result in dimensional instability.

The foldable member of this invention includes an integral hinge made of the same material that the tube is made of resulting in sharp weight reduction and improved dimensional stability that is especially well suited for space applications.

This invention features a foldable member comprising a tube, at least one predetermined hinge area along the length of the tube, and a plurality of opposing elongated slots in the tube at the hinge area thereof forming separated longitudinal strips of tube material between the slots which fold when subjected to localized buckling forces.

There may be two diametrically opposing elongated slots in the tube forming two diametrically opposing longitudinal strips or there may be three opposing elongated slots and three opposing elongated strips, each longitudinal strip diametrically opposing an elongated slot.

Typically, there are a plurality of hinge areas longitudinally spaced from each other along the length of the tube, each hinge area including opposing elongated slots.

The tube may be made of plastic (e.g. polycarbonate) material, a metal material, or a composite material such as a triaxial braid of fibers in the shape of a tube embedded in a resin matrix.

This invention also features a collapsible structure comprising a plurality of joined members. A selected number of these members each include a tube, at least one predetermined hinge area along the length of the tube, and a plurality of opposing elongated slots in the tube at the hinge area thereof forming separated longitudinal strips of tube material between the slots which fold when subjected to localized buckling forces.

DISCLOSURE OF PREFERRED EMBODIMENT

Other objects, features and advantages will occur to those skilled in the art from the following description of a preferred embodiment and the accompanying drawings, in which:

FIG. 9 is a front elevational view of another embodiment of the foldable member of this invention;

FIG. 10 is a side elevational view of another embodiment of the foldable member of the subject invention;

FIG. 11 is a view similar to FIG. 11 showing the interior rear side wall of the foldable member of the subject invention;

FIG. 12 is a front elevational view of a single monolithic elongated foldable member with multiple hinge areas in accordance with this invention; and FIG. 13 is a schematic view of the member of FIG. 13 in folded position.

Figure 1:
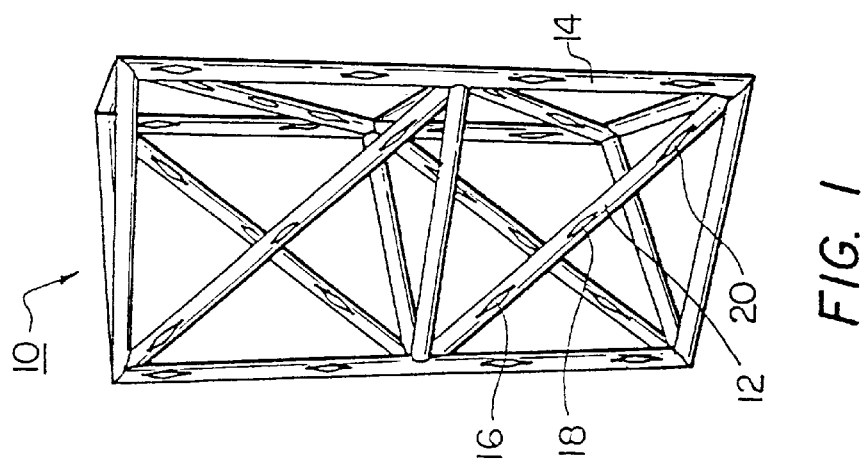
FIG. 1 is a perspective view of a structure made of a number of foldable members in accordance with the subject invention.

Truss structure 10, FIG. 1, of this invention includes a plurality of joined truss members 12 and 14 as shown. Truss structure 10, for example, may be 1.25 meters tall but collapsible to a height of 27 centimeters as shown in FIG. 2 due to the foldable nature of truss member 12 (and other selected truss members) which includes hinge areas 16, 18, and 20 along its length.

Depending on its specific design, hinge area 16 may fold downward, hinge area 20 may fold upward, and hinge area 18 may fold in the direction out of the plane of the drawing.

Figure 2:
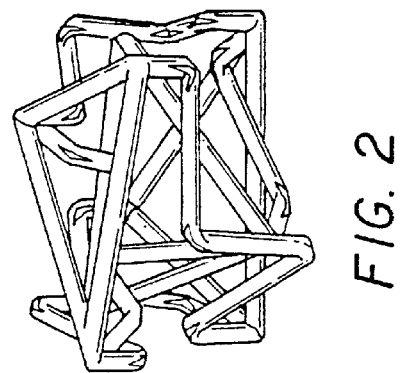
FIG. 2 is a schematic view of the structure shown in FIG. 1 in a collapsed state.

When collapsed as shown in FIG. 2, the volume of truss structure 10 is sharply reduced resulting in significant space savings for space flight.

Figure 3:
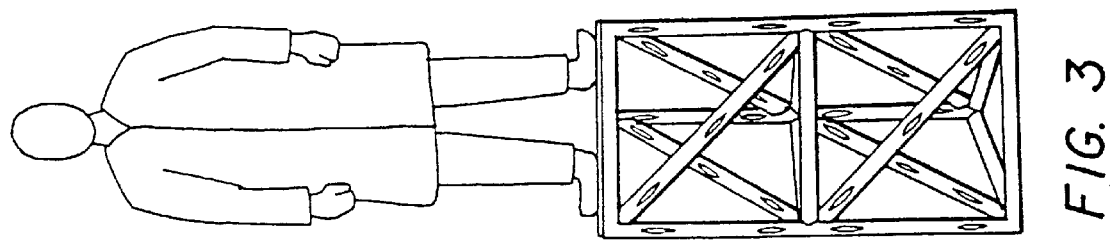
FIG. 3 is a perspective view of the structure of FIG. 2 after it expands from the collapsed condition.

Upon deployment in outer space, however, truss structure 10 automatically expands as shown in FIG. 3 to its original configuration and may be used as a frame for solar panels, various optical devices, or as a part of a superstructure when joined to similar structures.

As shown in FIG. 3, the truss structure is strong under compression and can support a load of at least 200 pounds. Its also strong against bending and torque since the individual hinge areas can only be actuated by intentional localized buckling force applied directly to the hinge areas.

Figure 4:
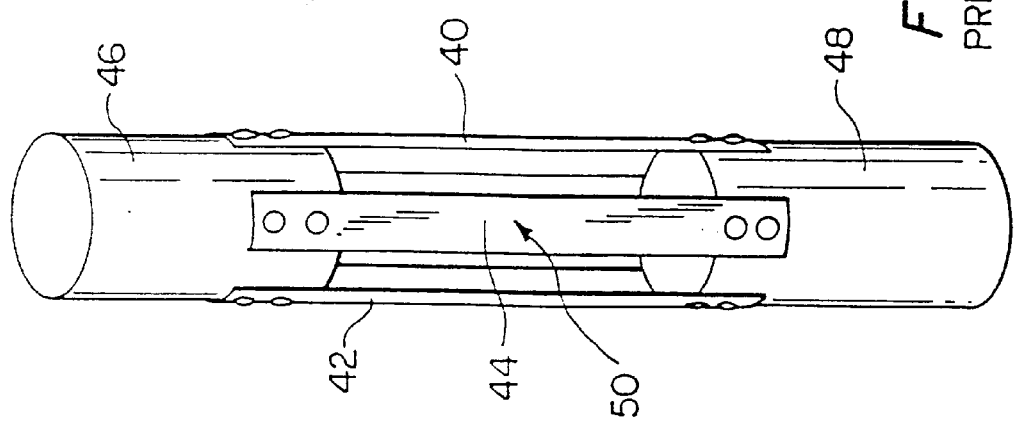
FIG. 4 is a front elevational view of a prior art foldable device.

In the prior art, the hinges are formed in the truss members by cutting the truss members at the desired hinge area and attaching clam shell shaped steel spring elements 40, 42, and 44, FIG. 4 to truss member sections 46 and 48.

Figure 5:
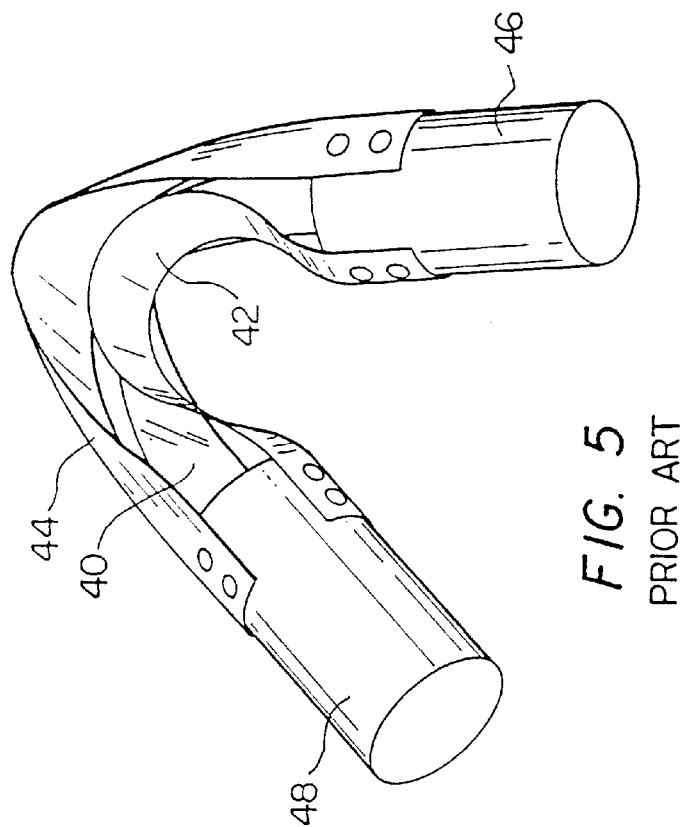
FIG. 5 is a view of the prior art device shown in FIG. 4 in the folded position.

The spring steel elements are similar to lengths of carpenter's tape from a tape measure. When a localized buckling force is imparted to one spring element as shown at 50 and the two truss member sections are subjected to a bending force, the spring elements readily bend, collapsing the truss member as shown in FIG. 5. If one truss member section is released, the clam shell shape of the spring steel elements spring the truss members into the configuration shown in FIG. 4.

However, these and other such truss members suffer from numerous shortcomings as discussed in the Background of the Invention above, including the fact that they are not thermally stable. Also, the joints between each spring steel element and the truss member sections can shift slightly and/or a spring steel element may yield while the truss structure is in the collapsed condition. When this truss structure is deployed in space it may not return to its original shape, resulting in dimensional instability which can severely affect the performance of sensitive equipment and optical devices. Other prior art devices added significantly to the overall weight of the system, were not dimensionally stable, and/or were complex, and/or costly.

Figure 8:
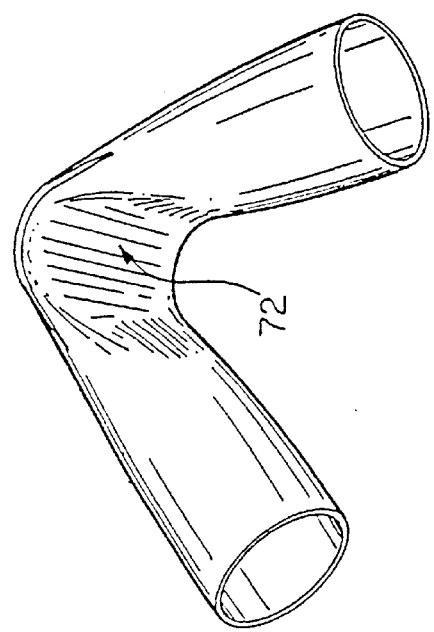
FIG. 8 is a schematic view of the foldable member shown in FIGS. 6 and 7 in a folded position.
Figure 6:
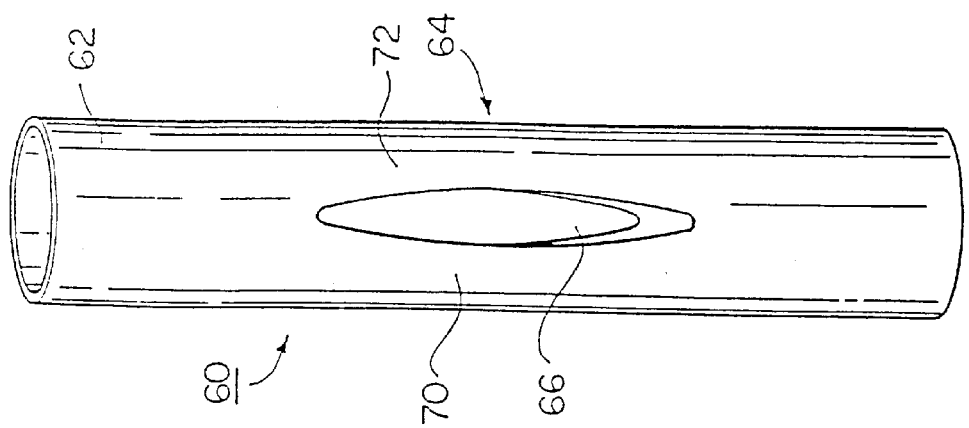
FIG. 6 is a side elevational view of the foldable member of the subject invention.

In contrast, the subject invention solves these problems in part by a monolithic foldable member with an integral hinge constructed of the same material as the member. In other words, the member and the means which allow the member to fold or bend are integrated and made out of the same material in a single, continuous member. Foldable member 60, FIG. 6, is made of tube 62 having at least one predetermined hinge area 64. Hinge area 64 includes opposing, elongated slots 66 and 67 (see FIG. 7) forming separate longitudinal strips 70 and 72 of tube material between the slots. These strips 70 and 72 fold when subjected to localized buckling forces as shown in FIG. 8, thereby allowing the member to fold at the hinge area about axis 74, FIG. 7. "Slots" as used herein means openings, slits, and cuts of any configuration.

Because member 60 is constructed of a single, continuous material, it is dimensional stable and extremely reliable. In addition, by tailoring the material of tube 62, the thermal expansion and/or conductivity of member 60 can be precisely tailored to meet various performance requirements. At the same time, member 60 is sufficiently strong with respect to torsion, shear, and buckling for numerous applications.

Figure 7:
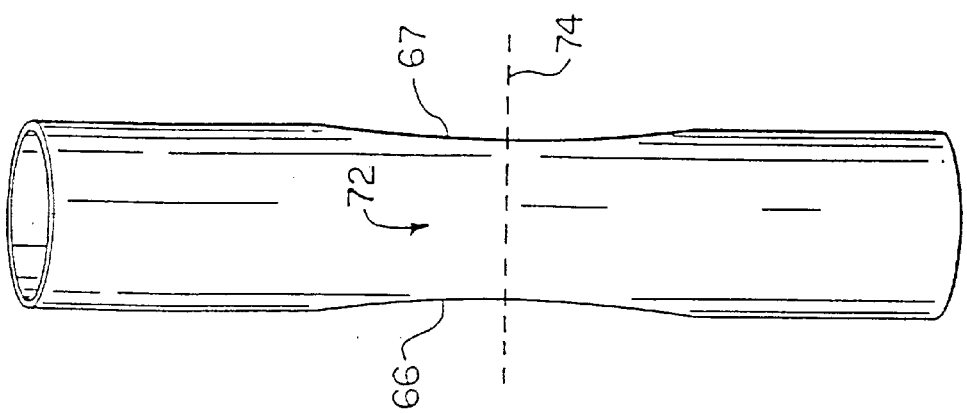
FIG. 7 is a front elevational view of the foldable member shown in FIG. 6.

Slots 66 and 67, as shown in FIGS. 6 and 7, are diametrically opposing but this is not a limitation of the present invention. For example, in the embodiment shown in FIG. 9, there are three opposing elongated slots 90, 92, and 94 and three opposing longitudinal strips 96, 98, and 100 (see also FIG. 10). Longitudinal strip 96 is diametrically opposed to elongated slot 94, longitudinal strip 98 is diametrically opposed to slot 90 and longitudinal slot 100 diametrically opposes slot 92. Therefore, the slots are spaced around the circumference of the tube in a generally opposing configuration, but a given slot may not diametrically oppose another slot even if there are only two slots. Also, although the slots are each shown to be of the same construction, this is not a limitation of the present invention as the length and opening width of the slots at a given hinge area may be different depending on the specific design. Furthermore, the slots may vary from a mere slit to a wide elongated opening. For example, slots 66 and 67, FIGS. 6 and 7, are simply a 4 inch long cut in a 1¾ inch tube. Slots 90, 92, and 94, on the other hand, are elliptically shaped and approximately ¹¹⁄₁₆ inches wide at their widest point.

As shown in FIG. 1, a given truss member may include a plurality of hinge areas such as hinge areas 16, 18, and 20 along the length of truss member 12. Therefore, any one member may include a number of hinge areas, each hinge area including two or more opposing elongated slots.

Tube 62, FIGS. 6–9 may be made of plastic material such as a polycarbonate material, but polyurethane, Delrin, or nylon tubes may also be constructed. Also, for space applications in particular, composite materials may be used including a braided fiber structure embedded in a resin matrix. In one example, carbon fibers were braided using a round braider to form a triaxial braid in a tubular shape which was then impregnated with a polycarbonate resin. A thin wall aluminum tube was wrapped in Teflon and over wrapped with a sheet of Lexan material. A triaxial carbon braid was formed over the Lexan sheet and additional layers of Lexan were added over triaxial braid. A combination of pressure and elevated temperature was used to consolidate the Lexan material into the fibers. The slots were then cut into the tube in the desired configuration. The tube may also be made of metal.

When structure 10, FIG. 1 was constructed of 1.5 inch diameter tubes similar to those shown in FIG. 9, it weighed 3.9 lbs. and supported a static load of more than 200 lbs. This 4 ft. tall structure is collapsible to an 11 inch tall folded package. Therefore, a 100 foot long structure could be packaged into a "Delta class" space vehicle for space deployment and would weigh less than 100 lbs. Since material is actually removed from each foldable member when the opposing slots are formed, the resulting structure weighs significantly less than prior art structures constructed of members including spring steel elements 40, 44, and 42, FIG. 4 or prior art structures with mechanical hinges.

In another embodiment, member 120, FIG. 10 includes opposing sets 122 and 124 of elongated slots. Thus, set 122 includes two slots, slot 126 and slot 128 separated by bridge element 130; and set 124 includes two slots, slot 132 and slot 134 separated by bridge element 136. Each slot was about ⅛" wide and about ⅝"long in a 1⅝ inch diameter Lexan tube. Each bridge element was about ³⁄₁₆ inches long.

In one embodiment, slot 126 is diametrically opposed from slot 132 and slot 128 is diametrically opposed from slot 134, although this is not a limitation of the present invention.

Also, stress relieving member 138 (e.g. a dowel) may be attached to each bridge element 130 and 136 on the inside of the tube for relieving the stress of each bridge member and to prevent them from tearing or cracking when the tube is folded.

The foldable member shown in FIGS. 10 and 11 proved to be generally stronger in and torsion than the members shown in FIGS. 6–9.

By including the hinges of this invention in a longeron twenty feet in length, it may be collapsed to a three foot long package, convenient for storage. A 3–4 inch diameter tube would typically have about a ¹⁄₁₆th inch wall thickness while a 1½ inch diameter tube would typically have a 0.020 inch wall thickness, although many different combinations of wall thickness and diameters are possible over a wide variety of tube lengths and tube materials for specific applications.

The result is an integral, monolithic (single material) foldable truss member, or longeron, or tube with no moving parts or joints and thus a lighter and more dimensionally stable structure. The hinge means or elements are made of the same piece of material as the tube unlike the spring steel elements of the prior art.

The members shown in FIGS. 6–11 could be a component of truss structure 10, FIG. 1 made of like truss members joined together as shown or instead could be a longeron of a frame or bulkhead or even a solitary boom or portion of an arm or other member.

In addition, the members shown in FIGS. 6–11 could be a part of other mechanical structures such as collapsible mobile bridges, erectable civil engineering structures for emergency response and disaster relief, tent poles, police barricades, and the like.

FIGS. 12 and 13 show foldable structural member 150 with elongated slots placed at different locations to allow the member to be folded at different angles of bend to accommodate unique storage and/or deployment requirements or sequencing.

Figure 14:
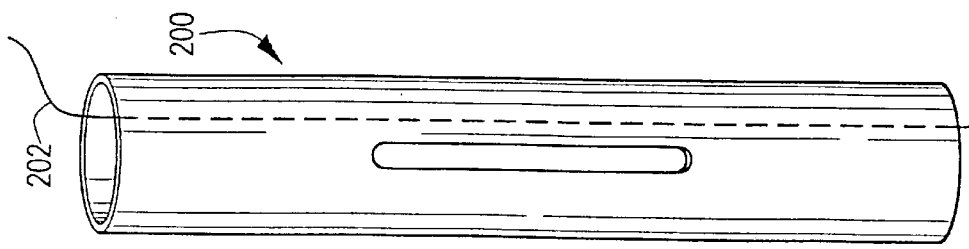

Foldable member 200, FIG. 14 is made of a fiber reinforced resin matrix composite material which includes embedded therein electrical conductor 202 for transmitting electrical signals from one location to another of the structure of which member 200 forms a part. Thus, the need for external connections and electrical conductors is eliminated.

Figure 15:
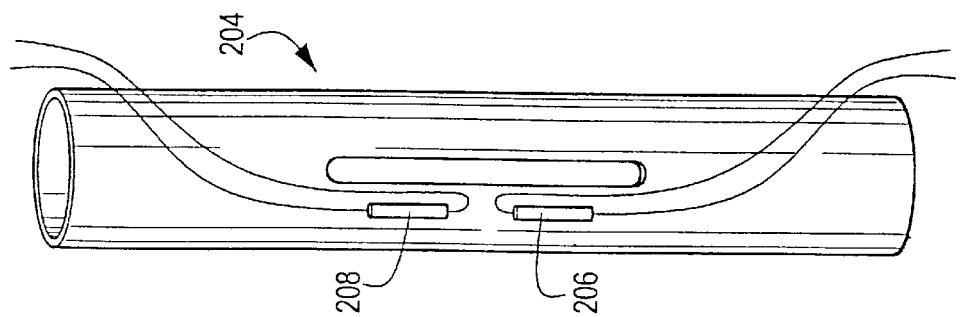

Foldable member 204, FIG. 15 includes transducers, a shape-memory alloy, or piezoelectric members 206 and 208 proximate hinge area 210 disposed on the outside or the inside of the tubewall of member 204 or embedded in the wall thereof to control the folding and unfolding of member 204 at hinge area 210.

Figure 16:
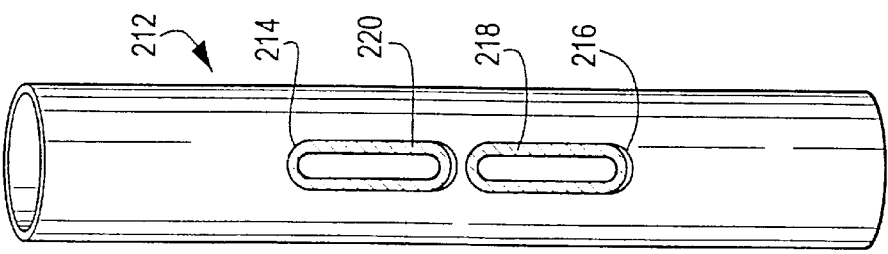

Foldable member 212, FIG. 16 includes elongated slots 214 and 216 and plastic webs 218 and 220 on or stretched partially over the slots on the inside of the tube to reinforce the slots. Webs 218 and 220 may be disposed wholly across the slots or may include orifices as shown in FIG. 16.

Figure 18:
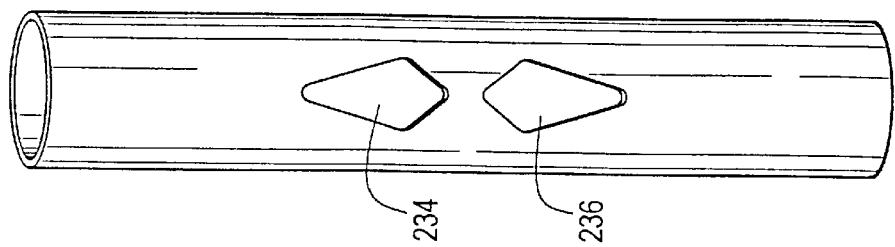
FIGS. 14–23 are schematic views of alternative embodiments of foldable members in accordance with the subject invention.
Figure 17:
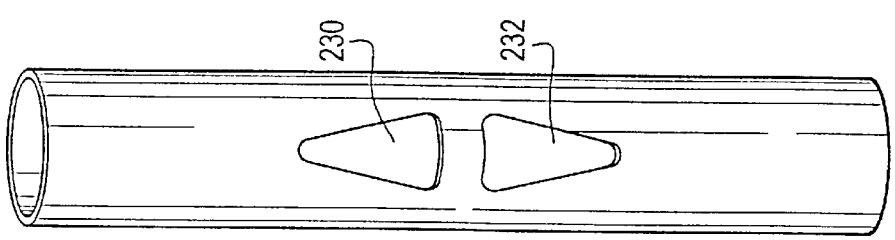
Figure 19:
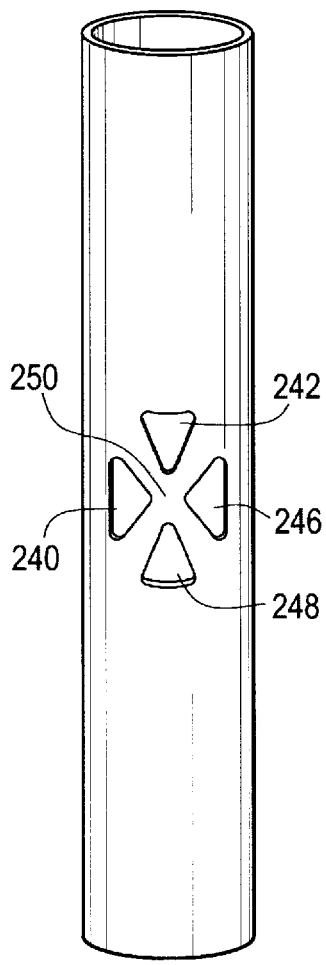
Figure 20:
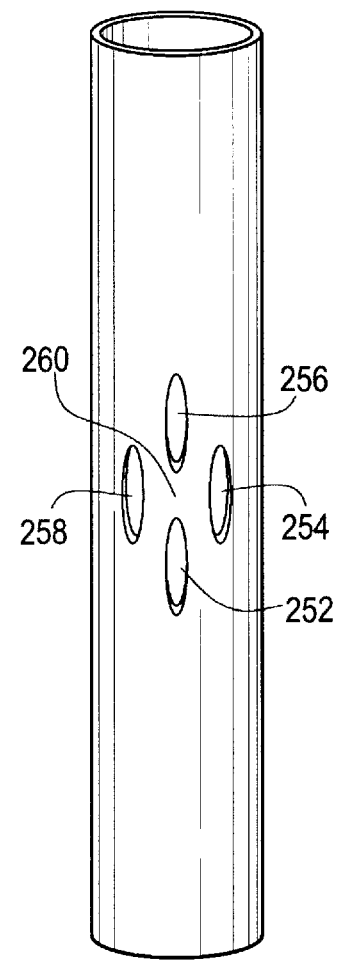

As shown in FIGS. 17–20, the slots need not be in the shape of elongated ovals. In FIG. 17, elongated slots 230 and 232 are shaped like triangles with the corners rounded. In FIG. 18, slots 234 and 236 are more diamond like in shape. In FIG. 19 four slots 240, 242, 244 and 246 from an X-pattern of tube material at hinge area 250. In FIG. 20, four oval shaped slots 252, 254, 256, and 258 form an X-pattern of tube material at hinge area 260.

Figure 21:
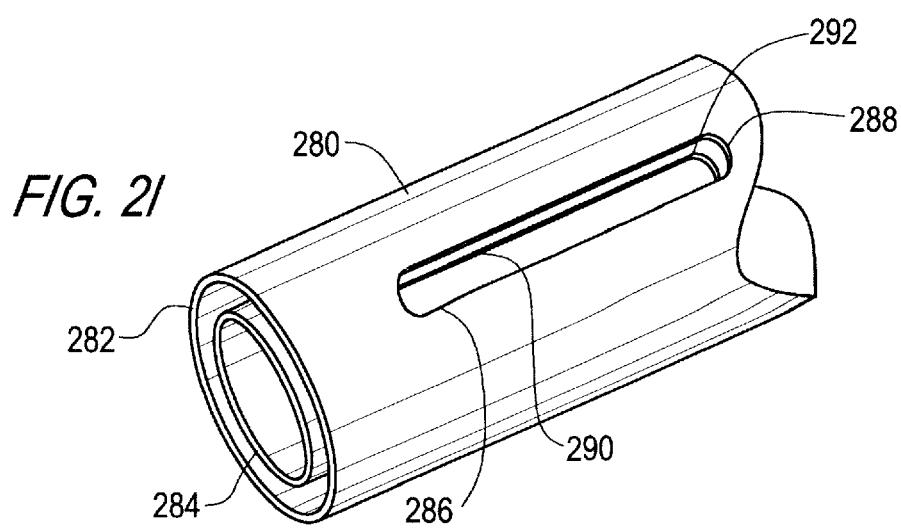

Foldable member 280, FIG. 21 includes nested outer tube 282 and inner tube 284 for improved stiffness. Slots 286 and 288 are present in the surface of outer tube 282 and coincident slots 290 and 292 are present in the surface of inner tube 284. An adhesive may be used to join inner tube 284 to outer tube 282.

Figure 22:
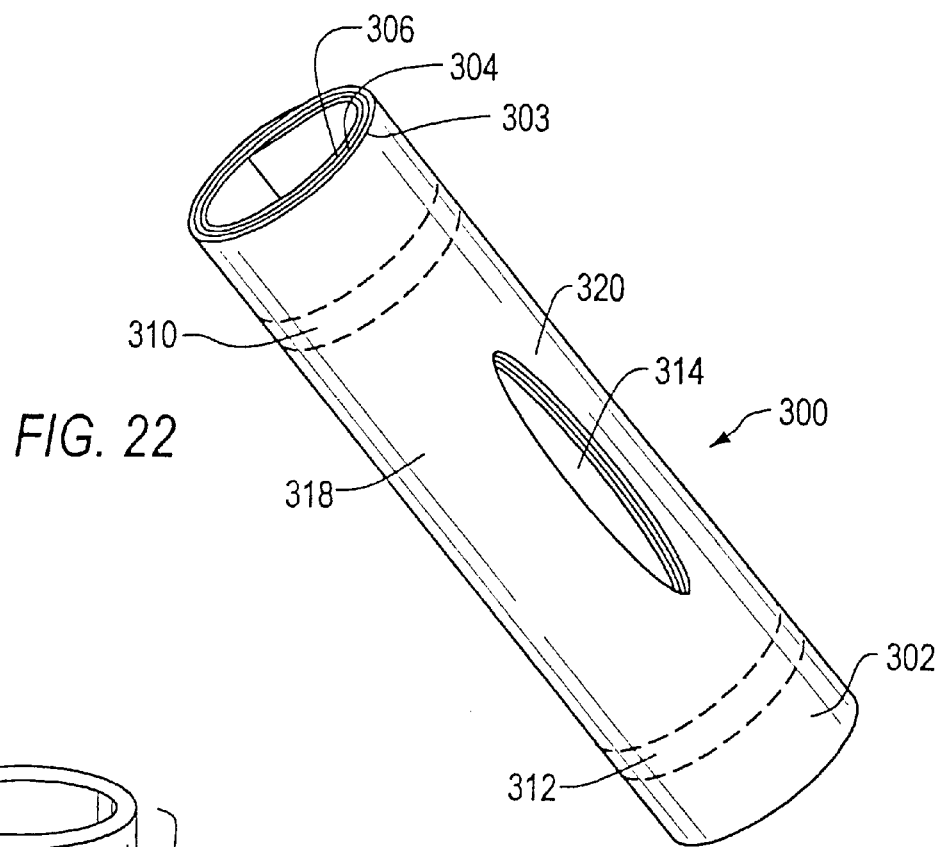
Figure 23:
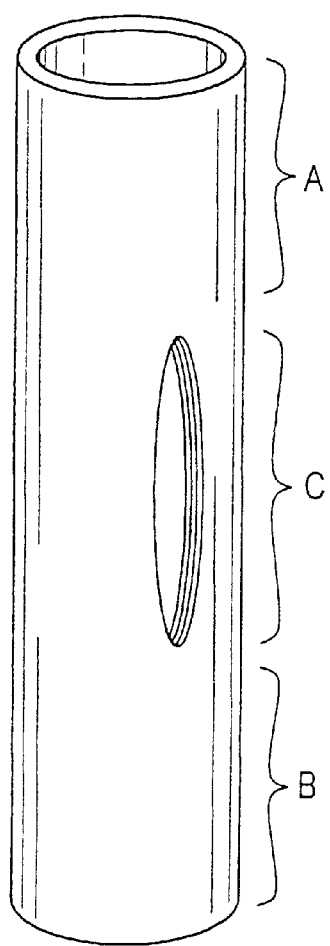

Foldable member 300, FIG. 22 includes tube 302 made of layers 303, 304, 306, etc. of material, plastic (e.g. Lexan), for example, formed by wrapping a sheet of the material around itself several perhaps even 20 or more times. An adhesive, for example a double sided tape, may be used to secure the layers of plastic material to each other at selected locations along the length of the tube for example at locations 310 and 312, shown in phantom. If the sheet of material comes off a round roll of stock material, it will have a tendency to roll up into a tube due to memory, an advantageous feature of this embodiment of the subject invention.

As with the other embodiments, slot 314 and an opposing slot (not seen in FIG. 24) is formed (e.g. cut) through all of layers 303, 304, and 306 forming longitudinal strips of layers of tube material 318 and 320 which fold when subjected to localized buckling forces. In this embodiment, additional strength is provided by virtue of the many individual columns of tube material.

In the embodiment shown in FIG. 25, these individual tube layers are laminated to each other in areas A and B but not at hinge area C. As such, the layers of tube material may be made of plastic or composite materials subjected to conventional lamination processes.

Although specific features of this invention are shown in some drawings and not others, this is for convenience only as each feature may be combined with any or all of the other features in accordance with the invention.

Other embodiments will occur to those skilled in the art and are within the following claims:

What is claimed is:

1. A foldable member comprising:

a tube;

at least one integral predetermined hinge area along the length of the tube; and a plurality of opposing elongated longitudinally running slots in the tube at the hinge area thereof forming separated longitudinal strips of tube material between the slots which fold when subjected to localized buckling forces.

2. The folding member of claim 1 in which there are two diametrically opposing elongated slots in the tube forming two diametrically opposing longitudinal strips.

3. The folding member of claim 1 in which there are three opposing elongated slots and three opposing elongated strips, each longitudinal strip diametrically opposing an elongated slot.

4. The foldable member of claim 1 in which there are a plurality of hinge areas longitudinally spaced from each other along the length of the tube, each hinge area including opposing elongated slots.

5. The foldable member of claim 1 in which the tube is made of a plastic material.

6. The foldable member of claim 5 in which the tube is made of a polycarbonate material.

7. The foldable member of claim 1 in which the tube is made of a composite material.

8. The foldable member of claim 7 in which the composite material contains a triaxial braid of fibers in a resin matrix.

9. A collapsible structure comprising:

a plurality of joined truss members;

a selected number of said truss members each including:

a tube;

at least one predetermined hinge area along the length of the tube; and a plurality of opposing elongated slots in the tube at the hinge area thereof forming separated longitudinal strips of tube material between the slots which fold when subjected to localized buckling forces.

10. A foldable member comprising:

a monolithic tube;

at least one integral predetermined hinge area along the length of the tube; and a plurality of opposing longitudinally running elongated slots in the tube at the hinge area thereof forming separated longitudinal strips of tube material between the slots which fold when subjected to localized buckling forces and which unfold automatically when released.

11. A foldable member comprising:

a monolithic tube;

at least one integral predetermined hinge area along the length of the tube; and elongated spaced slots circumferentially disposed in the tube at the hinge area thereof forming separated longitudinal strips of tube material between the spaced slots which fold when subjected to localized buckling forces and which unfold automatically when released.

12. A collapsible structure comprising:

a plurality of joined truss members;

a selected number of said truss members each including:

a tube;

at least one predetermined hinge area along the length of the tube; and a plurality of opposing longitudinally running elongated slots in the tube at the hinge area thereof forming separated longitudinal strips of tube material between the slots which fold when subjected to localized buckling forces.

* * * * *